United States Patent [19]

Plachy et al.

[11] Patent Number: 5,680,989

[45] Date of Patent: Oct. 28, 1997

[54] ADJUSTABLE WEIR FOR LIQUID DISTRIBUTION SYSTEMS

[75] Inventors: Richard F. Plachy, West Peru, Me.; Norman W. Gavin, North Haven, Conn.

[73] Assignee: Norman F. Gavin, North Haven, Conn.

[21] Appl. No.: 514,625

[22] Filed: Aug. 14, 1995

[51] Int. Cl.$^6$ ............... B05B 1/36; E02B 7/00; E03B 11/00; F17D 1/00
[52] U.S. Cl. ............... 239/193; 405/88; 405/90; 137/561 A; 137/577; 137/579
[58] Field of Search ............... 239/193, 194; 405/87, 88, 89, 90, 91; 137/561 A, 577, 579; 251/250

[56] References Cited

U.S. PATENT DOCUMENTS

| | | |
|---|---|---|
| 1,179,047 | 4/1916 | Snow ............... 251/250 X |
| 1,190,400 | 7/1916 | Giele . |
| 1,564,927 | 12/1925 | Ballard ............... 405/90 |
| 2,693,825 | 11/1954 | Carr ............... 251/250 X |
| 2,710,017 | 6/1955 | Carter ............... 251/250 X |
| 3,497,067 | 2/1970 | Tyson . |
| 4,298,470 | 11/1981 | Stallings . |
| 4,522,533 | 6/1985 | Campbell . |
| 4,605,501 | 8/1986 | Tyson . |
| 4,756,827 | 7/1988 | Mayer ............... 137/577 X |
| 5,107,892 | 4/1992 | Plachy . |
| 5,154,353 | 10/1992 | Plachy . |

Primary Examiner—Andres Kashnikow
Assistant Examiner—Robin O. Evans
Attorney, Agent, or Firm—Jones, Tullar & Cooper, P.C.

[57] ABSTRACT

An adjustable weir for use in a liquid distribution system utilizes a weir plate having a weir opening whose height can be adjusted vertically. The weir plate is mounted to the end of a fluid distribution outlet in a manner which will maintain its proper orientation while allowing its vertical position with respect to the outlet opening to be varied.

18 Claims, 4 Drawing Sheets

5,680,989

ADJUSTABLE WEIR FOR LIQUID DISTRIBUTION SYSTEMS

FIELD OF THE INVENTION

The present invention is directed generally to an adjustable weir for use in a liquid distribution system. More particularly, the present invention is directed to a height adjustable weir for a liquid distribution system. Most specifically, the present invention is directed to a height adjustable weir for control of low flows in a sewage distribution system. The adjustable weir or weirs are shiftable vertically to place them at proper heights so that the flow rates of fluid flowing from a fluid distribution center, such as a distribution box to a reservoir out through a plurality of distribution or drain lines or conduits can be controlled. The individual vertically adjustable weirs can be positioned to provide equal flow rates through each distribution line or can be set or positioned to provide unequal flow rates, if desired. Each adjustable weir has an opening which is, in its operative position, significantly larger at the top of the weir than at the bottom of the weir.

DESCRIPTION OF THE PRIOR ART

Liquid distribution systems have used weirs as flow control devices for a very long time. The use of a weir or dam to control flow from a distribution source through one or more of a plurality of distribution lines or channels was practiced by ancient farmers and is still in use today. A rudimentary weir can be adjusted by the simple expedient of piling more dirt in the flow path of an irrigation channel to reduce the flow. In more complex fluid distribution systems, adjustable weirs have found applications. In large water distribution systems there have been provided generally complex, cumbersome flow control gates, valves, and similar assemblies which are usable to control the flow of liquid.

In many areas of the country, home sewage effluent is handled by use of a septic tank and a distribution field. The sewage flows by gravity into the septic tank, typically in a very non-uniform or surging manner. The effluent is collected in the septic tank and may undergo settling or treatment. As the liquid level in the septic tank increases, the liquid will flow from the septic tank to a fluid distribution point or center which is typically a fluid distribution box. This distribution box or "tee" then distributes the liquid flow to several subsurface absorption areas through fluid distribution pipes or conduits.

The distribution box is typically provided with generally vertical walls having spaced apertures or knock-outs into which the ends of the distribution pipes are placed. These pipe ends have, in the past, acted as flow dividing weirs. In an ideal situation, the distribution box will be installed in a perfectly level manner and the low rate or volume flow through each of the various distribution pipes or conduits, to the several subsurface absorption areas will be equal. In actuality, the distribution box is either initially not perfectly level or, as frequently occurs, settles or shifts during installation. The inlets from the distribution box to the various distribution pipes or conduits are thus no longer at the same level. This results in unequal liquid flows to the subsurface absorption areas with a possible resultant over-saturation of one absorption area and no or very little flow to other areas. Since the flow rate through the lowest distribution pipe will have to reach some minimum value before the head inside the distribution box rises enough for there to be flow through any of the higher pipes, the result is a very poor flow division in the flow distribution box. These distribution points or boxes are always installed downstream of the septic tank. The sewage flow rates from the distribution point to the absorption areas are low and the flow distribution is apt to be very uneven and thus not particularly satisfactory.

One prior art solution for this problem has been the provision of flow equalizing weirs which are placed on or over the ends of the distribution pipes in the distribution box. These flow equalizing weirs are described in detail in U.S. Pat. Nos. 5,107,892 and 5,154,353, both to Richard F. Plachy, a co-inventor of the subject invention. The specifications of these patents are incorporated herein by reference. In the prior Plachy patents, equalization of flow is obtained by the use of distribution weirs with each such weir having an outlet opening from the distribution box to the distribution pipe which is generally U-shaped or cusp-shaped. Such a shape will allow the weirs to essentially be self-leveling, as discussed in the respective patents.

Other prior art solutions have been proposed to attempt to solve these problems in septic systems. One such solution is to drop the effluent over a knife edge as a means of flow division. This is shown in the prior art U.S. Pat. Nos. 3,497,067 and 4,605,501 to Tyson. Other attempted solutions have been to use dosing systems which pulse or transiently increase the flow rate, and by using a round orifice whose height is adjustable, as shown in U.S. Pat. No. 4,298,470 to Stallings. None of these prior art solutions has proved to be particularly effective.

The prior art has not provided a solution to the problem of non-uniform fluid distribution in a septic system. Each of the various prior art devices suffers from one limitation or another and has thus not provided a suitable solution. The adjustable weir for liquid distribution systems in accordance with the present invention overcomes the limitations of the prior art and is a significant improvement in the art.

SUMMARY OF THE INVENTION

It is an object of the present invention to provide an adjustable weir for a liquid distribution system.

Another object of the present invention is to provide a height adjustable weir for a liquid distribution system.

A further object of the present invention is to provide a height adjustable weir for control of low flows in a sewage distribution system.

Yet another object of the present invention is to provide a method for using height adjustable weirs to control fluid flow distribution in a septic system.

Still another object of the present invention is to provide an adjustable weir which can be properly positioned during installation in a distribution box.

Even yet a further object of the present invention is to provide a vertically height adjustable fluid flow distribution weir that is simple, durable and reliable.

As will be discussed in detail in the description of the preferred embodiments which is presented subsequently, the adjustable weir for liquid distribution systems in accordance with the present invention is particularly intended to be usable with a septic system having a fluid distribution point, such as a distribution box, to facilitate the flow of liquid from the distribution point, through a plurality of distribution pipes or conduits and to separate absorption areas in a controllable manner. In most instances, the adjustable weirs that are located at the fluid distribution point will be placed on the distribution box end of each of the plurality of distribution pipes and will all be positioned in their operative positions to equalize the flows through the various distribution lines. However, if it should be desirable to vary the flows through individual distribution conduits to accomplish more flow to, for instance, a particular absorption bed, the adjustable weirs can be set individually to accomplish this result.

In accordance with one preferred embodiment of the invention, the generally U, V, or cusp-shaped weir is formed in a circular plate which is, in turn, mounted eccentrically in a larger, rotatable plate that is positionable in the fluid distribution center such as being mounted on the distribution box or on the upstream end of the distribution pipe. This allows the vertical positioning or height of the weir to be varied while maintaining the proper operative orientation of the weir opening. In a second preferred embodiment of the vertical weir in accordance with the present invention, the weir is formed in a vertically slidable plate that is positioned in the distribution center such as by being attached to the distribution box or to the upstream end of the distribution pipe. A suitable rotatable knob, together with a rack and pinion arrangement, allows the height of the weir opening to be adjusted vertically with respect to the centerline of the distribution conduit.

The adjustable weir for liquid distribution systems in accordance with the present invention provides for the division of a liquid stream into two or more parts that will be equal even if the several distribution pipes are not evenly vertically aligned, and even at low flow rates. This will assure equal distribution of low volumes or flows of fluids, such as effluent from a septic tank, to several spaced subsurface absorption beds. Since each weir is adjustable vertically to its desired height or elevation, it is also possible, if desired, to provide unequal flow rates through the various distribution pipes.

The vertically adjustable weirs in accordance with the present invention utilize generally U, V, or cusp-shaped weirs. The two embodiments of the adjusting assembly both allow the height or vertical positioning of the weir to be accomplished while maintaining the appropriate operative orientation of the weir opening. In each of the preferred embodiments, the weir opening can be shifted vertically while retaining its proper operative alignment.

The adjustable weir for liquid distribution systems in accordance with the present invention overcomes the limitations of the prior art. It is a substantial advance in the art.

BRIEF DESCRIPTION OF THE DRAWINGS

While the novel features of the adjustable weir for liquid distribution systems in accordance with the present invention are set forth with particularity in the appended claims, a full and complete understanding of the invention may be had by referring to the detailed description of the preferred embodiments which are presented subsequently, and as illustrated in the accompanying drawings, in which:

DETAILED DESCRIPTION OF THE PREFERRED EMBODIMENTS

Figure 1:
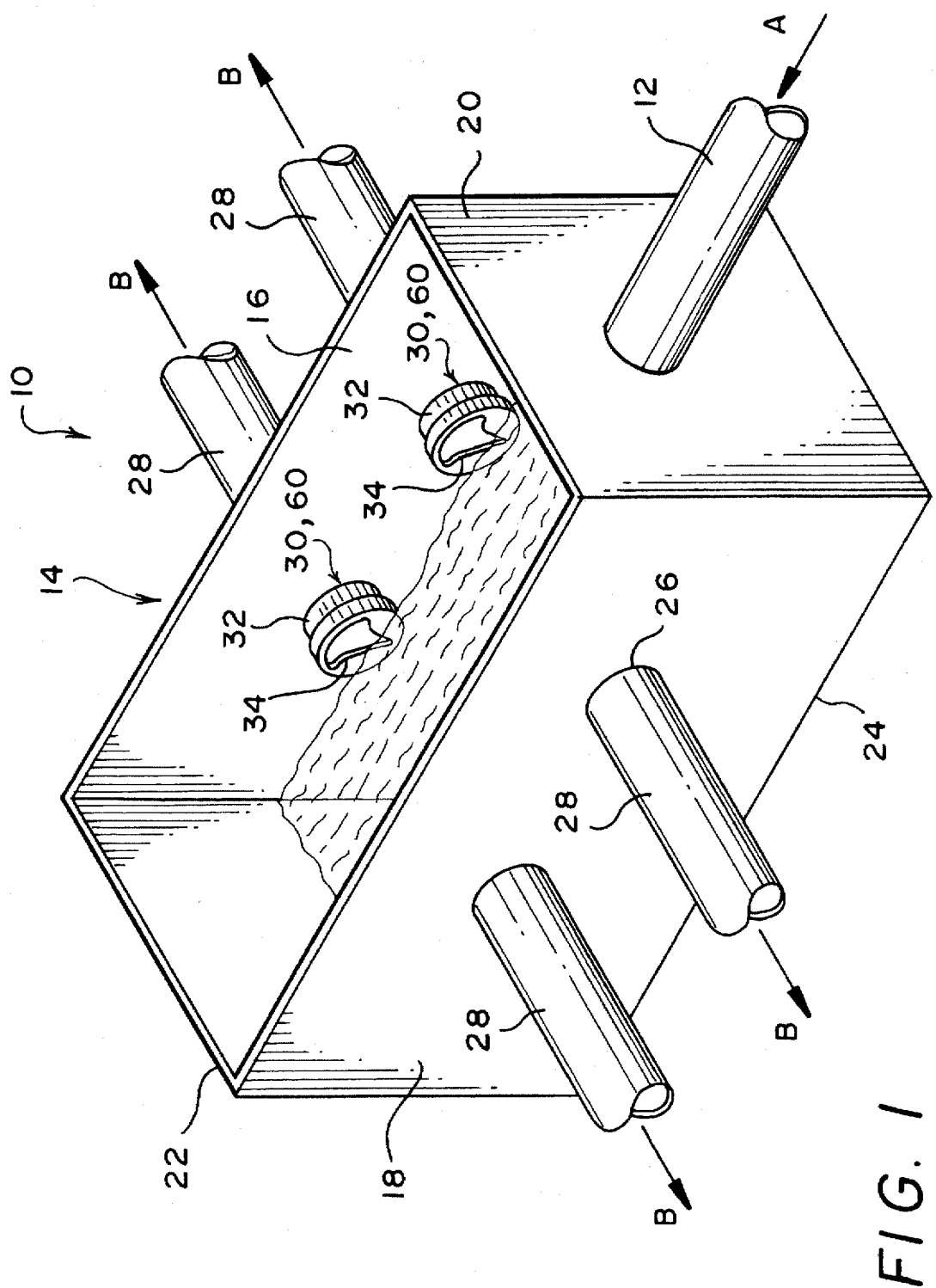
FIG. 1 is a perspective view of a distribution center, such as a distribution box containing adjustable weirs for liquid distribution systems in accordance with the present invention.

Referring initially to FIG. 1, there may be seen, generally at 10, a liquid distribution system in which the adjustable weir in accordance with the present invention preferably is used. This liquid distribution system 10 is typically utilized in a residential environment to distribute liquid effluent from the septic tank of a home waste disposal system to a plurality of subsurface absorption beds. In such a liquid distribution system, effluent is supplied from the septic tank or other similar reservoir through an inlet pipe 12 to a fluid distribution center, such as a distribution box, generally at 14, generally in the direction of the arrow A in FIG. 1. The distribution center or box 14 is depicted as being generally rectangular and is provided with spaced side walls 16 and 18, spaced end walls 20 and 22, a bottom 24 and would also be provided with a top or cover that is not shown in the drawings. These distribution boxes 14 are typically formed from concrete and typically have a plurality of openings 26 in their walls through which a plurality of distribution pipes or conduits 28 extend away from the distribution box 14. Effluent which enters the distribution box 14 through the inlet line 12 will flow out from the distribution box 14 through the plurality of distribution pipes 28 generally in the direction indicated by arrows B in FIG. 1.

As may be seen in FIG. 1, each distribution pipe 28 may have an adjustable weir, generally at 30, at the distribution box end 32 of each distribution or drain pipe 28. Alternatively, each outlet opening in the distribution center 14 could be provided with an adjustable weir 30 with the flow through each such weir 30 then being directed to a suitable distribution pipe or conduit 28. Each adjustable weir 30 has a weir opening 34 which is generally U, V, or cusp-shaped. Several suitable weir shapes are depicted in more detail in FIGS. 5–7 and will be discussed in greater detail subsequently. Each adjustable weir 30 is adjustable generally vertically, while remaining in its operative position, by utilization of one of the two preferred embodiments of the weir height adjusting mechanisms, as will be discussed shortly. The vertical position of each such weir 30 can be changed or shifted to compensate for manufacturing inaccuracies in the locations of the side wall openings 26, to compensate for the distribution box 14 being on other than level footing, or for any other reason which would act to cause inequalities in the rate of fluid flows from the distribution center or box 14 to the various distribution or drain pipes 28. By use of the adjustable weirs 30, these problems can be corrected and equal rates of flow from the distribution center 14 to the several drain pipes 28 will be assured. If it is desirable or necessary for the different discharge lines 28 to have differing flow rates, this can also be accomplished by varying the heights of the several weir openings 34. Each weir opening 34 can be set as desired to accomplish the desired flow profile from the distribution box 14.

Figure 2:
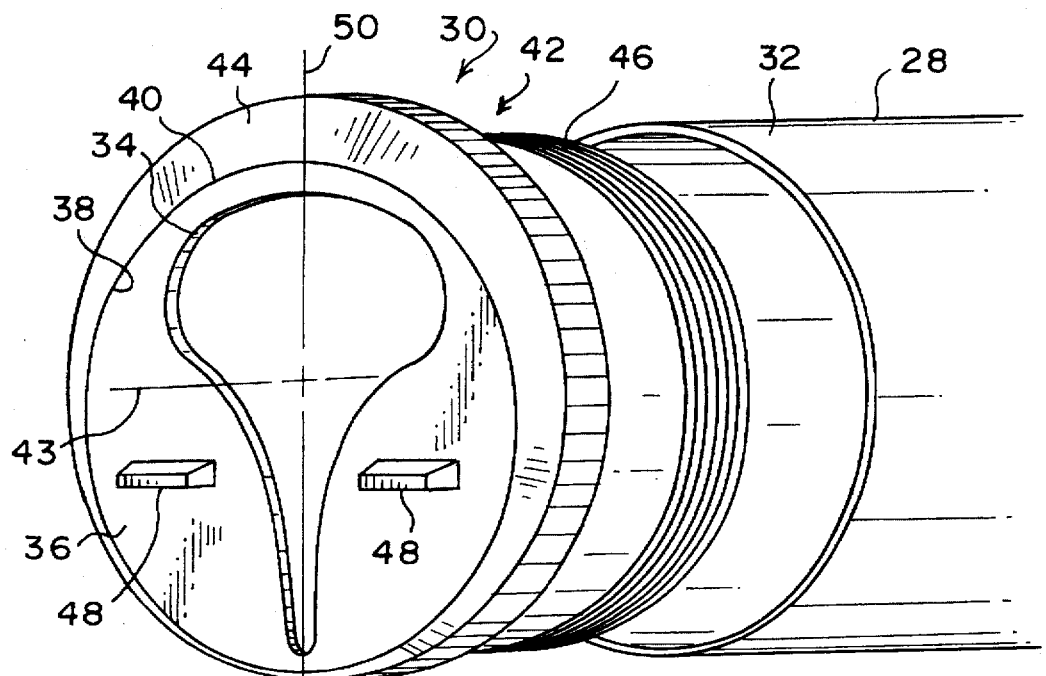
FIG. 2 is a perspective view of a first preferred embodiment of an adjustable weir of the present invention.

Referring now to FIG. 2, there may be seen a first preferred embodiment of an adjustable distribution weir 30 in accordance with the present invention. It will be understood that in FIG. 2, the side wall 18 of the distribution box 14 has been omitted for clarity. A generally circular movable weir plate 36 has weir opening 34 formed in it. This movable weir plate 36 is provided with an outer peripheral edge 38 that is rotatably received in an aperture 40 that is formed in a weir mounting plug 42. The aperture 40 is circular so that it will receive the circular weir plate 36, but is located eccentrically in a face portion 44 of the weir mounting plug 42 with respect to a central longitudinal axis 43 of the weir mounting plug 42 and forms a weir height adjusting assembly. As may be seen in FIG. 2, the weir mounting plug 42 has its face portion 44 sized to be larger than an outer diameter of an outlet opening 26 in the distribution box 14 or an outer diameter of the distribution pipe 28 with which it will be used. The weir mounting plug 42 also has a reduced diameter plug body 46 that is sized to be slidably received within the outlet opening 26 or within the distribution box end 32 of the distribution pipe 28. A pair of spaced lugs 48 are provided in the outer surface of the weir plate 36 so that the weir plate 36 can be rotated or turned respective to the plug face 44 of the weir mounting plug 42.

In use, the distribution box 14 is placed in the soil or on whatever surface it will be supported by, and is rendered as level as possible by conventional means. The various distribution or discharges pipes 28, as well as the effluent inlet pipe 12 are inserted through the several wall openings 26 in the distribution box. A weir mounting plug 42 is placed in each wall outlet opening 26 or in the distribution box end 32 of each discharge pipe 28 by insertion of the plug body 46 into the wall outlet opening 26 or into the pipe end 32. Each weir mounting plug 42 is oriented so that the weir plate 36 which it carries will be at its lowest possible level. This is accomplished by placing each eccentrically located aperture 40 in each plug face 44 with its center as low as possible with respect to the centerline of its associated discharge opening. The distribution box 14 is now filled with liquid until the highest weir opening 34 just starts to flow liquid. The several other weir openings 34 in the other discharge openings 26 or pipes 28 can now be raised to the same level. This is accomplished by rotating each weir mounting plug 42 with respect to its opening 26 or its pipe 28 and by concurrently rotating each weir plate 36 in its weir plug 42. The outwardly projecting lugs 48 facilitate rotation of the weir plate 36 in the eccentrically located weir plug aperture 40. The weir plate 36 is rotated so that it will remain in its operative position which is typically such that its vertical axis of symmetry 50 will remain vertical. Although not specifically shown in the drawings, it will be understood that the weir plate 36 and the weir plug aperture 40 will be formed with, for example, cooperating lips or flanges so that they are rotatable with respect to each other while being relatively leakproof. Since the flow rates through the weir openings 34 is typically quite low, and further since the distribution pipes 28 are only partially submerged in the effluent in the distribution box 14, the interface between the rotatable weir plate 36 and the aperture 40 located eccentrically in the weir plug face 44 does not have to be totally liquid impervious. Similarly, the plug body 46 will be sized so that it will be capable of being rotated with respect to the outlet opening 26 or the distribution box end 32 of the discharge pipe 28. Once the several adjustable weirs 30 have all been set, the cover can be placed on the distribution box 14 and the box can then be carefully buried. If it is subsequently determined that the flow rates have become unequal due to shifting of the ground beneath the distribution box 14, the box can be unearthed, its cover removed, and the flow rates can again be equalized by changing of the height of one or more of the weir openings 34 through rotation of the mounting plug 42 and re-alignment of the weir plate 36 to maintain the weir opening 34 in its desired operative position.

Figure 3:
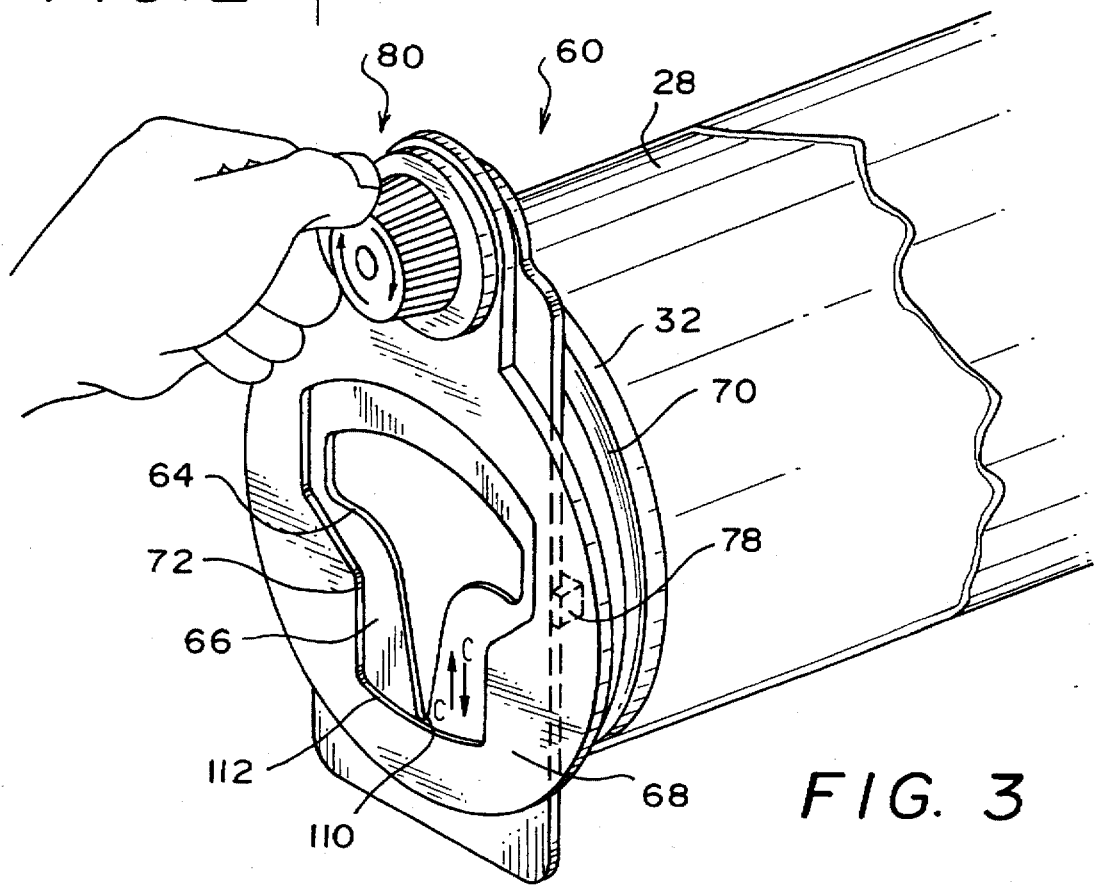
FIG. 3 is a perspective view of a second preferred embodiment of an adjustable weir.
Figure 4:
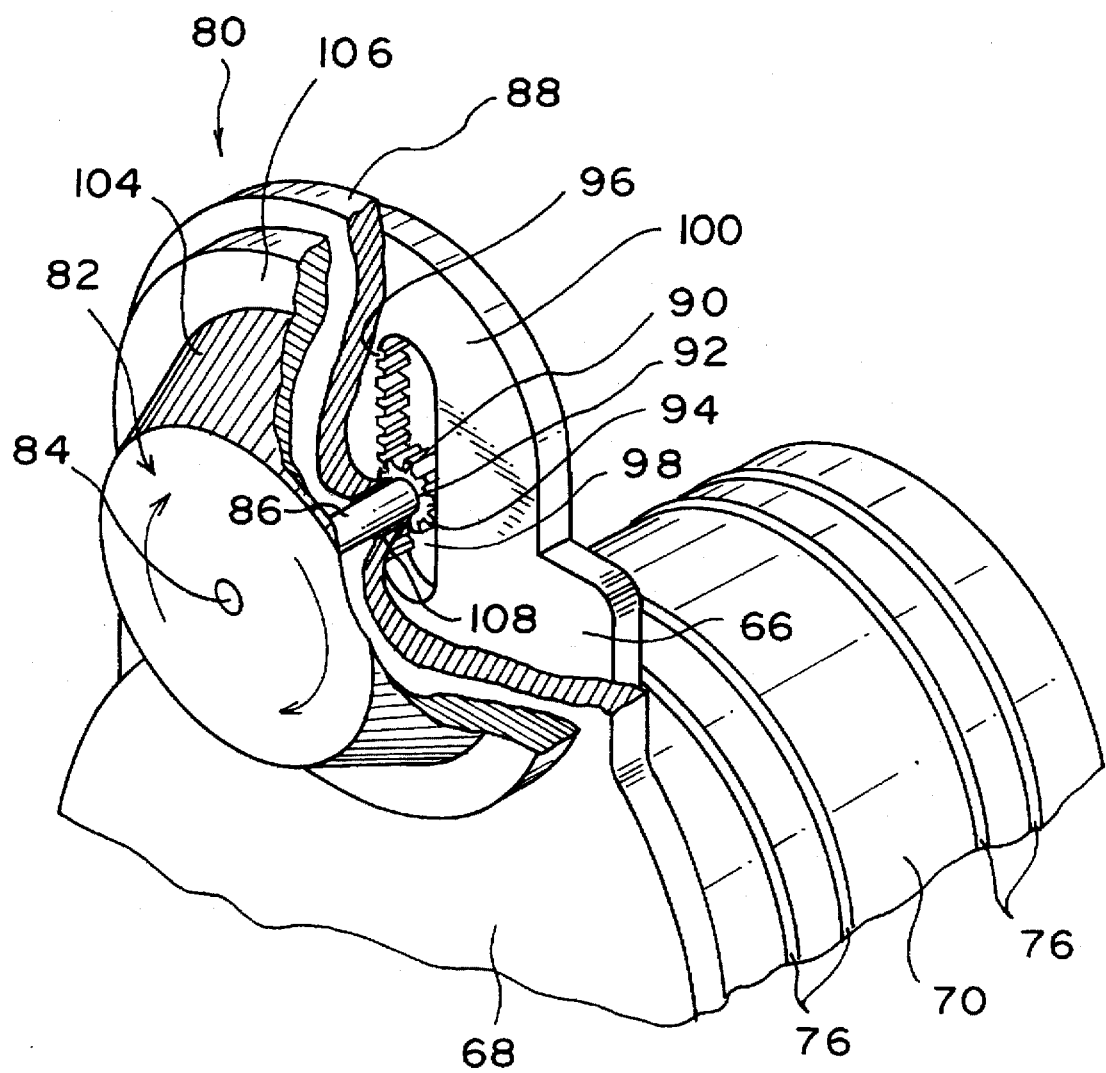
FIG. 4 is an enlarged perspective view, with portions cut away, of the adjustment mechanisms for the adjustable weir depicted in FIG. 3.

Referring now to FIGS. 3 and 4, there may be seen, generally at 60, a second preferred embodiment of an adjustable weir in accordance with the present invention. This second preferred embodiment 60 will accomplish the same result as the first adjustable weir 30; i.e. it will allow the elevation of each weir opening to be changed so that the effective elevations of all of the weir openings will be at the same height thus insuring even flow of the effluent liquid from the distribution box 14 through each of the several distribution openings 26 or the several discharge pipes or conduits 28.

In the second preferred embodiment 60 of an adjustable weir in accordance with the present invention, a weir opening 64 is formed in a movable weir plate 66 which is supported for movement generally in a vertical direction, as indicated by the arrows C in FIG. 3. The movable weir plate 66 is generally square or rectangular and is slidably supported between a front weir support plate 68 and a leading end of a rearwardly extending plug body 70. Weir support plate 68 has a central aperture 72 with this central aperture 72 in the front weir support plate 68 being depicted in FIG. 3. The rearwardly extending plug body 70 is similar to the plug body 46 portion of the first preferred embodiment of the adjustable weir 30. This plug body 70, which is depicted in FIG. 4 and which may be provided with axially spaced thin flexible seal rings 76, is receivable within the distribution box end 32 of each of the distribution or discharge pipes or conduits 28 or may be placed directly in one of the wall outlet apertures 26 in the distribution box 14. As was the case with the first preferred embodiment, the plug body 70 fits snugly within the distribution box end 32 of each discharge pipe 28 or the hole 26 in the box 14 but can allow the adjustable weir 60 to be rotated within the pipe 28 or distribution box wall outlet 26, if necessary to insure that the weir opening 64 is properly positioned in operative orientation.

Referring again to FIGS. 3 and 4, the slidable weir plate 66 is sandwiched between the front weir support plate 68 and the leading end of the plug body 70 and is restrained from horizontal or lateral shifting by suitable guide pins, flanges, or other restraints, one of which is depicted schematically at 78 in FIG. 3. These guide pins or tabs 78 extend rearwardly from the rear wall of the front weir support plate 68 to allow the weir plate 66 to be moved vertically up or down but to prevent the plate 66 from moving laterally.

A weir height adjusting assembly, generally at 80 utilizes, as may be seen in FIGS. 3 and 4, a rotatable weir height adjusting knob 82, which is secured to a first end 84 of a weir height adjusting shaft 86 which is, in turn, supported for rotation in an upwardly projecting ear 88 of the front weir support plate 68, as may be seen most clearly in FIG. 4. A pinion gear 90 is supported at a second, inner end 92 of the weir height adjusting shaft. This pinion gear 90 has gear teeth 94 that are in gear mesh engagement with a rack 96 which is formed in an aperture 98 formed in an upper portion 100 of the weir plate 66. The weir height adjusting knob 82 may be provided with a knurled or grooved peripheral surface 104 and also with a support flange 106, all as seen most clearly in FIG. 4. The shaft 86 may also be provided with suitable detents 108 that interact with the support plate 68 to allow the shaft 86 to be rotated in a plurality of small steps and to remain at a desired height.

In use, one of the second preferred embodiments of the adjustable weir, generally at 60, in accordance with the present invention is installed in the distribution box end 32 of each discharge pipe 28 by insertion of the plug body 70 into the pipe end. Alternatively, one adjustable weir 60 may be positioned in each distribution center outlet opening 26 by insertion of the plug body 70 into the opening 26. The weir height adjusting knobs 82 are turned to lower all of the weir plates 66 to a lowest operative level in which an apex 110 of each weir opening 64 is at the level of a lower horizontal edge 112 of the central aperture 72 in the front weir support plate 68. Fluid is then allowed to enter the distribution box 14 and rises in the box until there is accomplished fluid flow out through all of the discharge pipes 28. When this point is reached; i.e. when fluid flow is just starting in the highest discharge pipe 28, fluid flow into the distribution box 14 from the effluent inlet pipe 12 is halted. Now all of the weir plates 66 of all of the other adjustable weirs 60 are raised by appropriate operation of their individual weir height adjustment assemblies 80. This will result in the effective heights of all of the weir openings 64 being the same, as was also the case in the first preferred embodiment. This will insure that fluid flow from the distribution box 14 through the various adjustable weirs 60 to their respective distribution pipes or discharge pipes 28 will be equal. It will also be understood that, as was also possible with the first preferred embodiment of the adjustable weir 30, the individual weir openings 64 can be set at different heights with respect to each other, if desired. Such a setting might be appropriate if the subsurface absorption beds serviced by the various discharge pipes 28 have differing sizes or absorption capacities and thus should receive differing amounts of liquid effluent from the distribution box 14.

Figure 5:
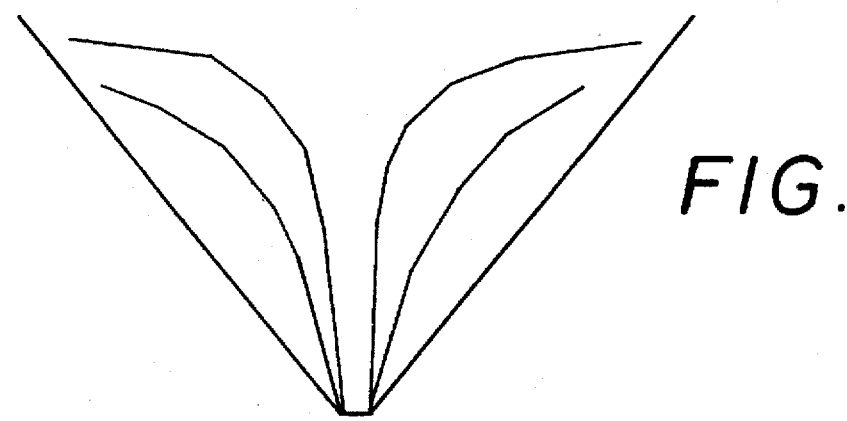
FIGS. 5–7 show schematic depictions of several weir shapes usable in the adjustable weir of the present invention.
Figure 6:
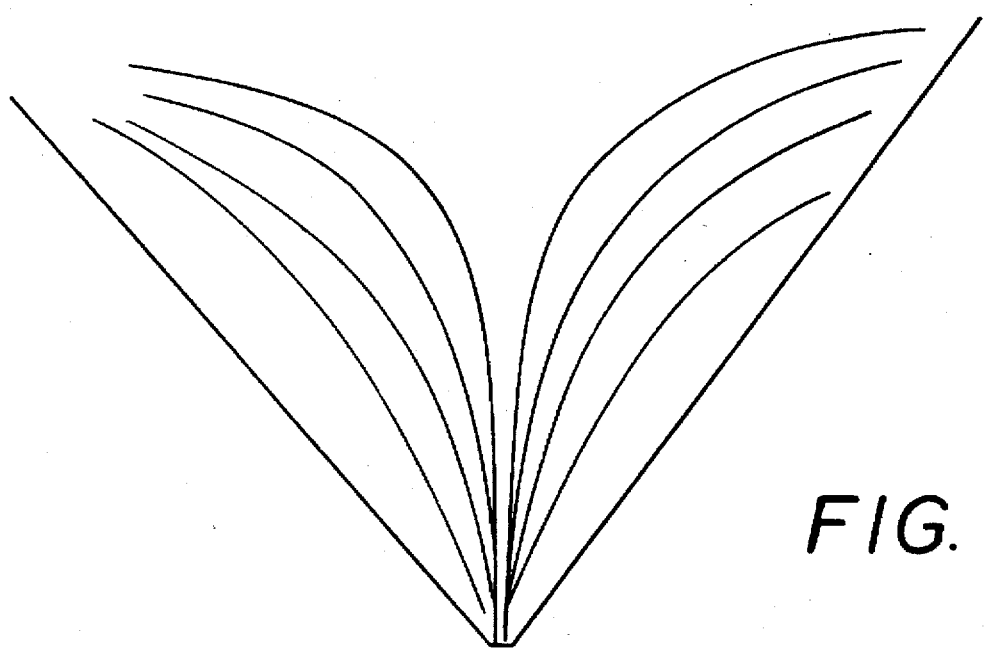
Figure 7:
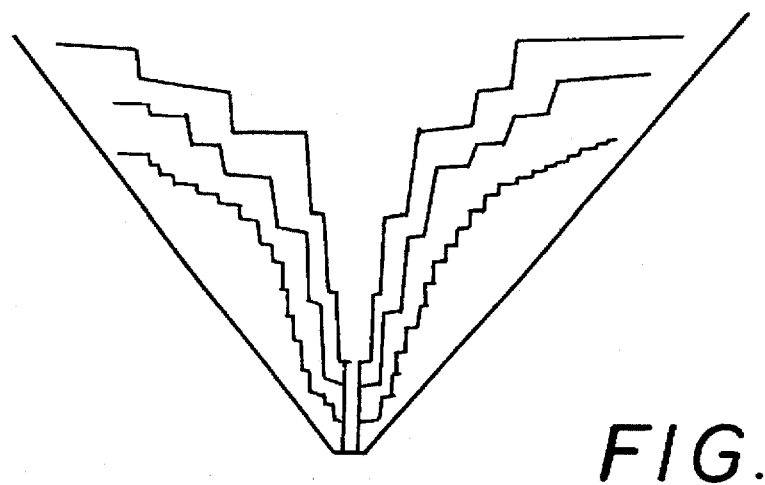

Referring now to FIGS. 5, 6 and 7, there may be seen several possible weir opening profiles that are usable with the present invention. These weir shapes are discussed in greater detail in the co-inventor's prior U.S. Pat. No. 5,154,353. If the weirs are structured as discussed in this prior art patent, then raising one of the weirs will decrease its flow rate, as compared to the other weirs by an exact ratio (such as 0:75:1) as compared to weirs set to the static water line. This ratio will be maintained over the entire range of flow rates. The several weir shapes depicted in FIGS. 5, 6 and 7 all increase generally in width with increasing height at a rate which is linear or greater than linear. This may be done monotonically, in a series of straight line segments, or in a series of steps. As may be seen these weir shapes are generally U, V, or cusp-shaped.

The adjustable weir assemblies in accordance with the present invention are particularly usable to accomplish accurate flow division in a septic system. The distribution box is typically only crudely leveled and will typically be tipped or shifted during installation of the inlet pipe and the distribution pipes. The resultant inaccuracies in flow division which would result if the adjustable weirs of the present invention were not used, would result in poor performance of the septic system. Placing the weir openings all at the same elevation, as is possible by use of the present invention provides for equal flows, even at low flow rates.

While preferred embodiments of an adjustable weir for liquid distribution systems in accordance with the present invention have been set forth fully and completely hereinabove, it will be apparent to one of skill in the art that a number of changes in, for example the overall sizes of the adjustable weirs, the specific materials used in their construction, the number of pipes in the distribution box and the like could be made without departing from the true spirit and scope of the present invention which is accordingly to be limited only by the following claims.

What is claimed is:

1. An adjustable weir for a liquid distribution system comprising:

a weir plate having a generally cusp-shaped weir opening which has a vertical axis of symmetry and which has a preferred operative orientation in which said vertical axis of symmetry is generally vertical;

a weir plate height adjusting means supporting said weir plate;

means for shifting said weir plate in said weir plate height adjusting means to vary a vertical position of said weir opening in said adjusting means while maintaining said weir opening's vertical axis of symmetry in a generally vertical orientation; and means to position said weir plate height adjusting means in said liquid distribution system.

2. The adjustable weir of claim 1 wherein said liquid distribution system includes a distribution center having an effluent inlet pipe and a plurality of fluid distribution outlets, one of said adjustable weirs being positioned in each of said plurality of fluid distribution openings.

3. The adjustable weir of claim 2 wherein said weir plate is generally circular.

4. The adjustable weir of claim 3 wherein said weir plate height adjusting means includes a weir plate mounting plug having an aperture in which said circular weir plate is rotatably supported, and further wherein said fluid distribution outlet has a central axis, said aperture being eccentrically positioned in said plug with respect to said central axis.

5. The adjustable weir of claim 4 wherein said weir plate mounting plug has a plug face and wherein said aperture is in said plug face.

6. The adjustable weir of claim 4 further including a plug body in said weir plate mounting plug, said plug body being rotatably supported in said fluid distribution outlet.

7. The adjustable weir of claim 4 wherein said weir plate has spaced, outwardly projecting lugs to facilitate rotation of said weir plate in said aperture.

8. The adjustable weir of claim 1 wherein said weir plate is generally rectangular.

9. The adjustable weir of claim 8 wherein said weir plate height adjusting means includes a front weir support plate having an aperture and with said weir plate being supported for vertical movement with respect to said weir support plate.

10. The adjustable weir of claim 9 including a rotatable weir height adjusting shaft supported by said front support plate and having a first end provided with a rotatable knob and a second end provided with a pinion gear and further including a toothed rack on said weir plate, said toothed rack being engaged by said pinion gear to accomplish said shifting of said weir plate upon rotation of said weir height adjusting shaft.

11. The adjustable weir of claim 10 wherein said weir height adjusting shaft has a plurality of detents to provide a stepwise shifting of said weir plate.

12. The adjustable weir of claim 9 further including a plug body which is rotatably positionable in said liquid distribution system.

13. A method for accomplishing fluid flow distribution in a liquid distribution system including the steps of:

providing a liquid distribution center having at least one fluid inlet and a plurality of fluid distribution outlets;

placing a weir assembly having a weir opening and a weir height adjusting assembly on each of said fluid distribution outlets;

providing each weir opening with a generally cusp shape having a lower apex;

supporting each said weir assembly for movement of each said generally cusp-shaped weir opening generally vertically on each of said fluid distribution outlets;

setting said apex of said cusp-shaped weir opening for each of said weir assemblies at its lowest height;

flowing fluid to said distribution center and increasing a fluid level in said center until fluid flow is initiated through said apex of a highest one of said weir assemblies; and adjusting the remaining ones of said weir assemblies generally vertically until heights of apexes of their weir openings match that of said apex of said highest weir assembly.

14. An adjustable weir for a liquid distribution system comprising:

a generally circular weir plate having a weir opening which has a preferred operative orientation;

a weir plate height adjusting means supporting said weir plate, said weir plate height adjusting means including a weir plate mounting plug having an aperture in which said circular weir plate is rotatably supported;

at least one fluid distribution outlet in said liquid distribution system, said fluid distribution outlet having a central axis, said aperture being eccentrically positioned in said plug with respect to said central axis; and means for shifting said weir plate in said weir plate height adjusting means to vary the position of said weir opening in said adjusting means while maintaining said opening's operative orientation.

15. The adjustable weir of claim 14 wherein said weir plate mounting plug has a plug face and wherein said aperture is in said plug face.

16. The adjustable weir of claim 14 further including a plug body in said weir plate mounting plug, said plug body being rotatably supported in said fluid distribution outlet.

17. The adjustable weir of claim 14 wherein said weir plate has spaced, outwardly projecting lugs to facilitate rotation of said weir plate in said aperture.

18. An adjustable weir for a liquid distribution system comprising:

a generally rectangular weir plate having a weir opening which has a preferred operative orientation;

a weir plate height adjusting means supporting said weir plate, said weir plate height adjusting means including a front weir support plate having an aperture, said weir plate being supported for vertical movement with respect to said weir support plate;

a plug body which is rotatably positionable in said liquid distribution system, said plug body supporting said weir plate height adjusting means; and means for shifting said weir plate in said weir plate height adjusting means to vary the position of said weir opening in said adjusting means while maintaining said opening's operative orientation.

* * * * *